United States Patent
Veselov et al.

(10) Patent No.: US 11,055,475 B2
(45) Date of Patent: Jul. 6, 2021

(54) CROSS-BROWSER TECHNIQUES FOR EFFICIENT DOCUMENT PAGINATION

(71) Applicant: Microsoft Technology Licensing, LLC, Redmond, WA (US)

(72) Inventors: Evgeny Veselov, Sammamish, WA (US); Erfan Ghazi Nezami, Bothwell, WA (US); Leeviana Peng Gray, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/426,799

(22) Filed: May 30, 2019

(65) Prior Publication Data
US 2020/0349219 A1 Nov. 5, 2020

Related U.S. Application Data

(60) Provisional application No. 62/843,009, filed on May 3, 2019.

(51) Int. Cl.
*G06F 17/00* (2019.01)
*G06F 40/114* (2020.01)
(Continued)

(52) U.S. Cl.
CPC .......... *G06F 40/114* (2020.01); *G06F 40/117* (2020.01); *G06F 40/14* (2020.01)

(58) Field of Classification Search
CPC ...... G06F 40/114; G06F 40/117; G06F 40/14; G06F 16/9577
(Continued)

(56) References Cited

U.S. PATENT DOCUMENTS 6,675,351 B1 * 1/2004 Leduc .................. G06F 40/177
715/264
8,914,813 B1 * 12/2014 Sigurdsson ........... G06F 16/957
719/328

(Continued)

FOREIGN PATENT DOCUMENTS

| CN | 106560805 A | 4/2017 |
|---|---|---|
| EP | 0917071 A2 | 5/1999 |

(Continued)

OTHER PUBLICATIONS

"Rendering: repaint, reflow/relayout, restyle", Retrieved from: https://www.phpied.com/rendering-repaint-reflowrelayout restyle/, Dec. 17, 2009, 16 Pages.

(Continued)

*Primary Examiner* — Jason T Edwards

(57) ABSTRACT

Cross-browser techniques for efficient document pagination are provided. In one set of embodiments, a computer system can receive an indication of a starting point for a page in a content flow of a document and build a DOM tree of content elements in a portion of the content flow spanning from the starting point to an estimated ending point, the estimated ending point corresponding to an estimated ending boundary for the page. The computer system can further invoke an API that causes a layout engine of the web browser to create a layout of the page based on the DOM tree and determine, based on the layout and the content flow, one or more content elements in the content flow that fall beyond an actual ending boundary of the page. The computer system can then remove the one or more content elements from the DOM tree and add the DOM tree to a page set for the document.

21 Claims, 11 Drawing Sheets

(51) Int. Cl.
*G06F 40/14* (2020.01)
*G06F 40/117* (2020.01)

(58) Field of Classification Search
USPC .......................................................... 715/251
See application file for complete search history.

(56) References Cited

U.S. PATENT DOCUMENTS

| | | | |
|---|---|---|---|
| 9,727,293 B1 | 8/2017 | White et al. | |
| 2006/0242557 A1* | 10/2006 | Nortis, III | G06F 40/14 |
| | | | 715/234 |
| 2008/0098300 A1* | 4/2008 | Corrales | G06F 16/986 |
| | | | 715/243 |
| 2008/0139191 A1* | 6/2008 | Melnyk | G06F 16/9577 |
| | | | 455/419 |
| 2009/0070413 A1* | 3/2009 | Priyadarshan | G06F 40/221 |
| | | | 709/203 |
| 2010/0262780 A1 | 10/2010 | Mahan et al. | |
| 2011/0209046 A1* | 8/2011 | Huang | G06F 16/9577 |
| | | | 715/234 |
| 2011/0252304 A1 | 10/2011 | Lemonik et al. | |
| 2017/0364485 A1 | 12/2017 | Kidambi et al. | |
| 2018/0052808 A1* | 2/2018 | Wan | G06F 40/14 |
| 2018/0101295 A1* | 4/2018 | Casey | G06F 3/0482 |
| 2018/0302468 A1* | 10/2018 | Hu | H04L 67/1014 |

FOREIGN PATENT DOCUMENTS

| | | |
|---|---|---|
| WO | 2012128950 A1 | 9/2012 |
| WO | 2013081470 A1 | 6/2013 |
| WO | 2016040076 A2 | 3/2016 |

OTHER PUBLICATIONS

Abdul-Rahman, et al., "Automatic Pagination of HTML Documents in a Web Browser", In Proceedings of the ACM symposium on Document engineering, Jul. 24, 2009, 5 Pages.

Kim, et al., "DOM tree browsing of a very large XML document: Design and implementation", In Journal of Systems and Software, vol. 82, Issue 11, Nov. 1, 2009, pp. 1843-1858.

Pepelnjak, Ivan, "Automate the Pagination of Your Web Pages", Retrieved from: http://www.informit.com/articles/article.aspx?p=691505&seqNum=3, Feb. 2, 2007, 3 Pages.

"XML Forms Architecture (XFA) Specification", Retrieved from: https://web.archive.org/web/20200618141058/https://reference.pdfa.org/iso/32000/wp-content/uploads/2017/04/XFA-3_3.pdf, Jan. 9, 2012, 19 Pages.

"International Search Report and Written Opinion Issued in PCT Application No. PCT/US2020/026791", dated Jul. 17, 2020, 12 Pages.

* cited by examiner

CROSS-BROWSER TECHNIQUES FOR EFFICIENT DOCUMENT PAGINATION

CROSS-REFERENCES TO RELATED APPLICATIONS

The present application claims the benefit and priority of U.S. Provisional Application No. 62/843,009, filed May 3, 2019, entitled "CROSS-BROWSER TECHNIQUES FOR EFFICIENT DOCUMENT PAGINATION." The entire contents of this provisional application are incorporated herein by reference for all purposes.

BACKGROUND

Pagination is the process of partitioning the content of an electronic document into limited, often fixed-sized, portions referred to as pages. Pagination is used in a number of different contexts, such as in WYSIWYG ("what you see is what you get") document editing programs to support document printing, print preview, presentation virtualization, and other similar features.

Some web browsers have built-in pagination algorithms for paginating browser documents like HTML (Hyper Text Markup Language) documents. However, because pagination is not standardized under the W3C HTML and CSS (Cascading Style Sheets) standards, not all web browsers implement this functionality. The web browsers that do natively implement pagination each do so differently and generally offer no, or very few, options for customizing their pagination behavior. This makes it difficult for developers to build web applications, such as web-based document editing programs, that support pagination in a consistent and flexible manner across all web browsers.

SUMMARY

Cross-browser techniques for efficient document pagination are provided. In one set of embodiments, a computer system can receive an indication of a starting point for a page in a content flow of a document and build a DOM tree of content elements in a portion of the content flow spanning from the starting point to an estimated ending point, the estimated ending point corresponding to an estimated ending boundary for the page. The computer system can further invoke an API that causes a layout engine of the web browser to create a layout of the page based on the DOM tree and determine, based on the layout and the content flow, one or more content elements in the content flow that fall beyond an actual ending boundary of the page. The computer system can then remove the one or more content elements from the DOM tree and add the DOM tree to a page set for the document.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview and Example Implementation Environment

Figure 1:
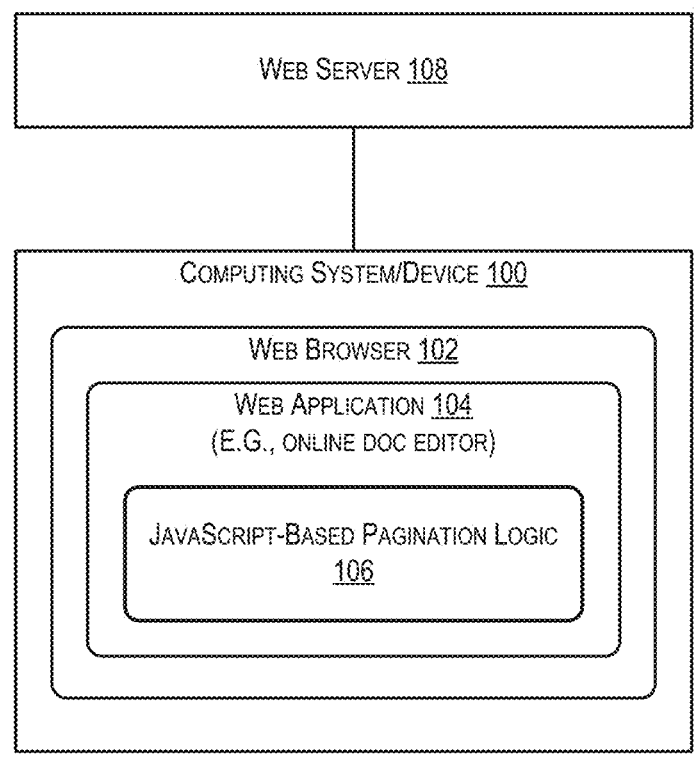
FIG. 1 depicts an example operating environment according to certain embodiments.

Embodiments of the present disclosure are directed to techniques for efficiently paginating browser documents (i.e., electronic documents designed to be presented in a web browser, such as HTML documents) in a manner that works across most or all currently-available web browsers. FIG. 1 is a simplified block diagram illustrating an example computing system/device 100 that implements these techniques according to certain embodiments. As shown, computing system/device 100 includes a web browser 102 running a web application 104. Web browser 102 may be, e.g., Microsoft Edge, Google Chrome, Mozilla Firefox, Apple Safari, or any other web browser known in the art. Web application 104 is assumed to be an application that allows for the manipulation and presentation of documents via web browser 102, such as an online document editor.

As noted in the Background section, pagination is often used by document editing applications like web application 104 to support features such as document printing, print preview, and presentation virtualization. Some web browsers natively implement pagination via built-in pagination algorithms, but this is not available on all browsers on the market today. Accordingly, web application 104 cannot rely on browser-specific pagination implementations while maintaining cross-browser compatibility. It is possible for web application 104 itself to implement pagination using "custom" document layout code (in other words, layout code that does not rely on any browser-based logic). However, such custom layout code is non-trivial to implement and will generally perform poorly due to the need for web application 104 to manage very large amounts of data (for, e.g., character glyphs, international properties, etc.) as well as handle the time-consuming task of sizing and positioning every character in a document.

To address the foregoing and other similar issues, web application 104 of FIG. 1 includes a novel set of pagination algorithms, collectively referred to as pagination logic 106, that are implemented using JavaScript. This pagination logic can be added to one or more HTML files of web application 104 by, e.g., the provider/developer of web application 104 and can be delivered to web browser 102 (as part of web application 104) from a web server 108 at a time a user of web browser 102 accesses application 104 via an appropriate URL (uniform resource locator). In some embodiments, pagination logic 106 may be packaged as a portable JavaScript library so that it can be easily reused by multiple different web applications/web pages.

At a high level, the algorithms included in JavaScript-based pagination logic 106 enable web application 104 to paginate browser documents by leveraging a built-in document layout engine of web browser 102 for certain parts of the pagination process (e.g., layout measurement and creation), rather than relying on custom layout code. All web browsers on the market today implement a built-in layout engine as part of their base feature set and make the functionality of this built-in engine available to client-side JavaScript code via standard, cross-browser JavaScript APIs. Note that this built-in layout engine is different from the built-in pagination algorithms noted earlier (which are only implemented in a few web browsers) because the built-in layout engine is directed to the general task of measuring and laying out the content of a document rather than the specific task of pagination.

By leveraging the built-in layout engine of web browser 102 as described above, pagination logic 106 can advantageously avoid incorporating custom code for the complex tasks of layout measurement and layout creation; instead, pagination logic 106 can rely on the browser to take care of these complex tasks via the browser's built-in layout engine, while logic 106 can directly handle other aspects of the pagination process. This results in relatively simple (in terms of code size) and efficient pagination code.

Further, because all web browsers available today support and expose layout functionality via standardized JavaScript APIs, pagination logic 106 can advantageously run on all such browsers without compatibility issues/concerns.

Yet further, pagination logic 106 can be easily extended and customized to support different application use cases that have different pagination requirements. Examples of such different requirements include the pagination of documents with headers and footers, footnotes, pages of varying sizes, and so on.

The remaining sections of this disclosure describe various algorithms that may be included in pagination logic 106 according to certain embodiments. For example, section (2) below describes two algorithms for paginating a browser document with a single linear flow of content: (A) a "create page" algorithm for defining a single page from a given starting position in the document (which can be repeated multiple times to divide the document into a set of pages), and (B) an "update page set" algorithm for updating the document's page set each time the document content is modified. In addition, section (3) below describes an enhanced version of the "create page" algorithm that can be employed for paginating a browser document with multiple linear content flows (e.g., a document with one or more tables).

Figure 2A:
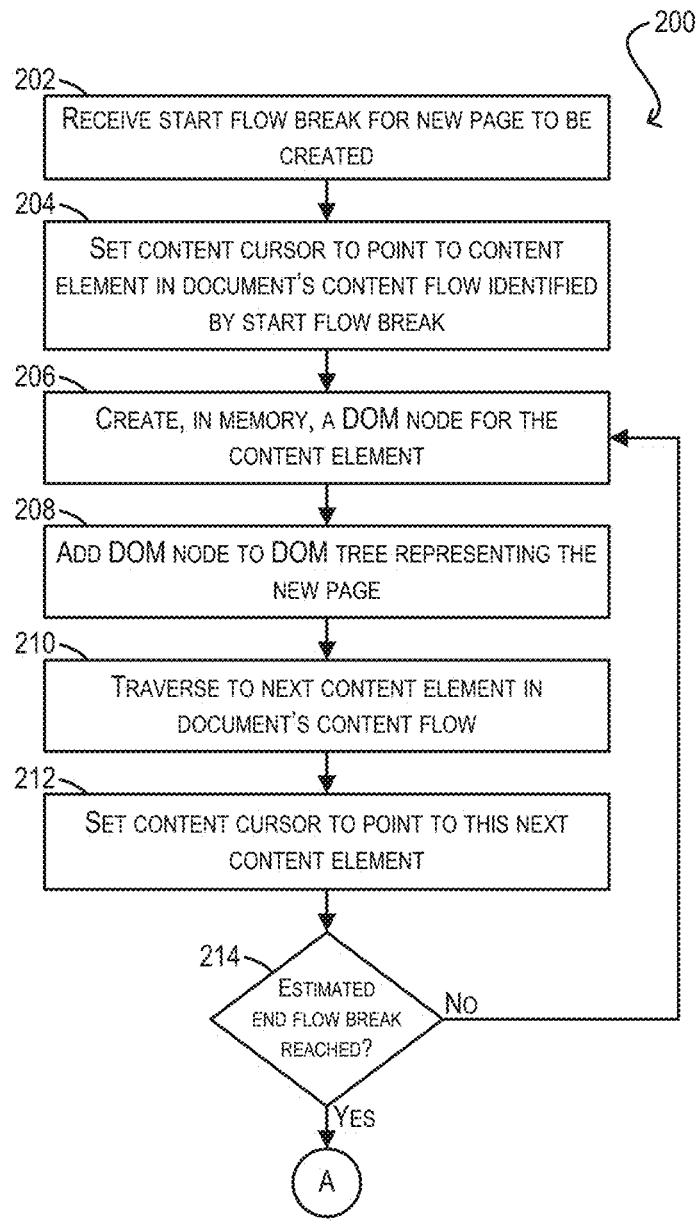
FIGS. 2A, 2B, and 2C depict a workflow for defining a page with respect to a browser document comprising a single linear content flow according to certain embodiments.
Figure 2B:
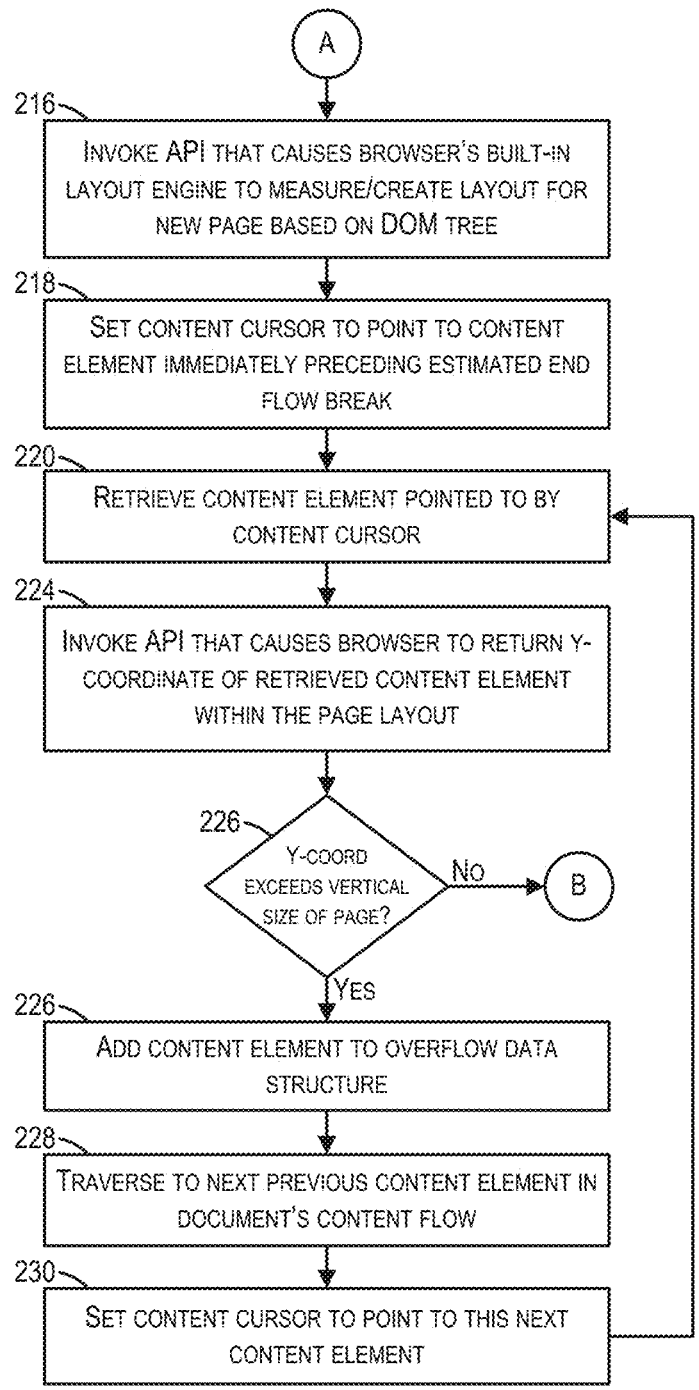
Figure 2C:
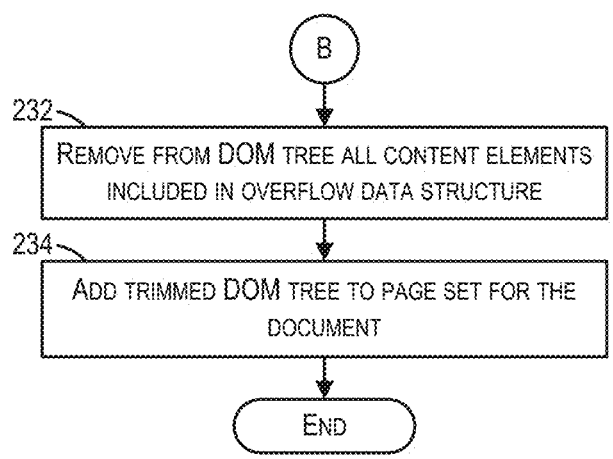

2. Pagination of a Browser Document with a Single Linear Content Flow 2.1 Create Page FIGS. 2A, 2B, and 2C depict a flowchart 200 of a "create page" algorithm that may be included in pagination logic 106 of FIG. 1 and executed by web application 104 for defining a single page with respect to a browser document according to certain embodiments, where the browser document's content is structured as a single linear flow. The act of "defining a page" with respect to a browser document refers to identifying content elements of the document (e.g., text characters, images, etc.) that fall within the boundaries of that page. Further, a "linear flow" or a "linear content flow" in a browser document refers to document content that is visually presented in a sequential manner without any branching paths. For example, a sequential series of paragraphs would be considered a linear content flow according to an embodiment. On the other hand, a table with two columns of text would not be considered a linear content flow because the reader may choose to read the left hand column content of the table or the right hand column content of the table. Accordingly, these two table columns can be considered two separate, parallel content flows. A further discussion of multiple content flows is provided in section (3) below.

In various embodiments, the create page algorithm shown in FIGS. 2A-C may be repeated several times with respect to a given document in order to partition the document into a page set, which is an ordered collection of pages defined on the document content.

FIG. 2A roughly corresponds to a first phase of the create page algorithm that involves "building visuals" for the new page to be defined/created (i.e., building a DOM (Document Model Object) tree representation of the page that can be laid out and rendered), with a certain amount of overflow so that the DOM tree includes some document content that extends beyond the ending boundary of the new page. FIG. 2B roughly corresponds to a second phase of the create page algorithm that involves "measuring the visuals" via the built in layout engine of web browser 102 (i.e., calculating precise graphical coordinates of a visual representation of the page) and traversing through the document's content flow in a bottom-up manner to determine the point at which the content has crossed the new page's ending boundary (i.e., has overflowed). Finally, FIG. 2C roughly corresponds to a third phase of the create page algorithm that involves removing from the DOM tree all DOM nodes representing the overflow content. Each of these phases are discussed in turn below.

2.1.1 Building Visuals

Starting with block 202 of FIG. 2A, web application 104 can receive an indication of a point within the document's linear content flow that corresponds to the desired starting point of the new page to be created. In various embodiments, this point (referred to as a "start flow break") can identify a particular content element (e.g., a text character, image, etc.) in the linear content flow.

At block 204, web application 104 can set a content cursor C to point to the content element identified by the start flow break. Web application 104 can then create, in system memory, a DOM (Document Object Model) node for the content element pointed to by content cursor C (block 206) and can add the created DOM node to a DOM tree representing the new page (block 208). Blocks 206 and 208 can be performed using appropriate JavaScript APIs defined under the W3C DOM standard.

At blocks 210 and 212, web application 104 can traverse to the next content element in the document's linear content flow that follows the previous content element and can set content cursor C to point to this next content element. In a particular embodiment, the document's linear content flow can be represented as a tree comprising intermediate nodes for formatting elements (e.g., paragraphs, titles, headers, etc.) and leaf-level nodes for content elements (e.g., text, images, etc.). In this embodiment, the traversal at block 210 can be carried out by moving to the next leaf-level node in the document tree.

Then, at block 214, web application 104 can check whether it has reached an estimated ending point, where this estimated ending point (referred to as an "estimated end flow break") corresponds to a location in the document's linear content flow that is, e.g., X number of content elements downstream from the start flow break. This number X will typically be predefined and correspond to an estimated number of content elements that can fit on a given page, with a certain amount of overflow onto the next page. For instance, if the start flow break corresponds to character C35 of the linear content flow, the estimated end flow break may be set for 300 text characters after C35, or character C335.

If the estimated end flow break has not been reached at block 212, web application 104 can return to block 206 and repeat the foregoing steps, thereby creating and adding a DOM node for this next content element to the in-memory DOM tree. This process can continue until the estimated end flow break is reached at block 212, at which point the algorithm can proceed to phase 2 depicted in FIG. 2B.

2.1.2 Measuring Visuals and Finding Overflow Position

At block 216 of FIG. 2B, web application 104 can invoke a standard cross-browser API that causes the built-in layout engine of web browser 102 to create/measure a visual representation of the new page based on the DOM tree built during phase 1 of the algorithm. This representation (referred to herein as the "page layout") includes the exact sizing and positioning of every page element in accordance with the DOM tree, as those elements would appear if rendered on-screen. Web application 104 can invoke any one of a number of standard cross-browser DOM APIs to carry out this step, such as the DOM offsetHeight API.

Once the browser's built-in layout engine has measured and created the layout for the new page, web application 104 can set content cursor C to point to the content element in the document's linear content flow that immediately precedes the estimated end flow break (block 218), retrieve the content element pointed to by cursor C (block 220), and invoke a browser API that causes web browser 102 to lookup and return the y-coordinate position of the retrieved content element, based on the page layout (block 222). In this way, the exact vertical position of this content element (in terms of, e.g., pixels) can be determined.

At block 224, web application 104 can determine whether the retrieved content element has crossed over the new page's ending boundary or not by comparing the y-coordinate value returned by web browser 102 at block 222 with the desired vertical size of the page (e.g., 1000 pixels). If the y-coordinate position exceeds the vertical size of the page, web application 104 can conclude that this content element is an overflow element and can add the element to an overflow data structure (block 226). Web application 104 can then traverse to the next previous content element in the document's linear content flow (block 228) and set content cursor C to point to this next content element (block 230) (thereby traversing in a bottom-up manner through the flow) and return to block 220 to repeat the foregoing steps until it finds a content element that has not overflowed the new page's ending boundary. At that point, web application 104 can proceed to phase 3 in FIG. 2C.

2.1.3 Removing Overflow Elements

At block 232 of FIG. 2C, web application 104 can remove, from its in-memory DOM tree representation of the new page, all of the overflow elements included in the overflow data structure (in other words, all of the content elements that have been determined during phase 2 to have crossed over the new page's ending boundary). In this way, web application 104 can essentially "trim" the DOM tree to include only those elements that fit onto the new page.

Finally, at block 234, computing system/device 100 can add the trimmed DOM tree of the new page to the page set for the document and the create page algorithm can end.

Figure 3:
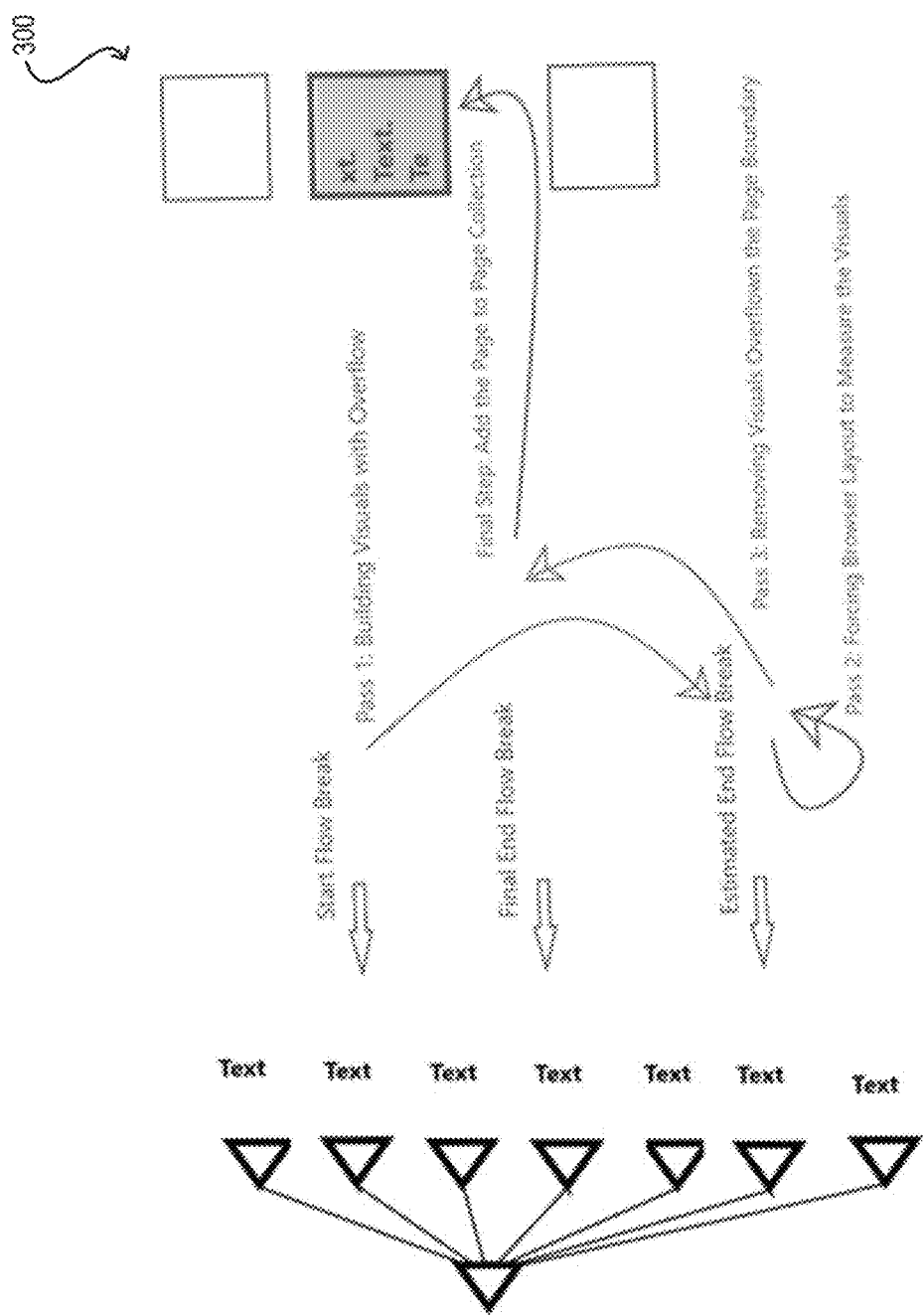
FIG. 3 depicts a high-level schematic diagram of the workflow of FIGS. 2A, 2B, and 2C according to certain embodiments.

To further illustrate the operation of the create page algorithm, FIG. 3 depicts a schematic representation 300 of the algorithm's execution in terms of the 3 phases (i.e., passes) described above.

2.2 Update Page Set

Figure 4:
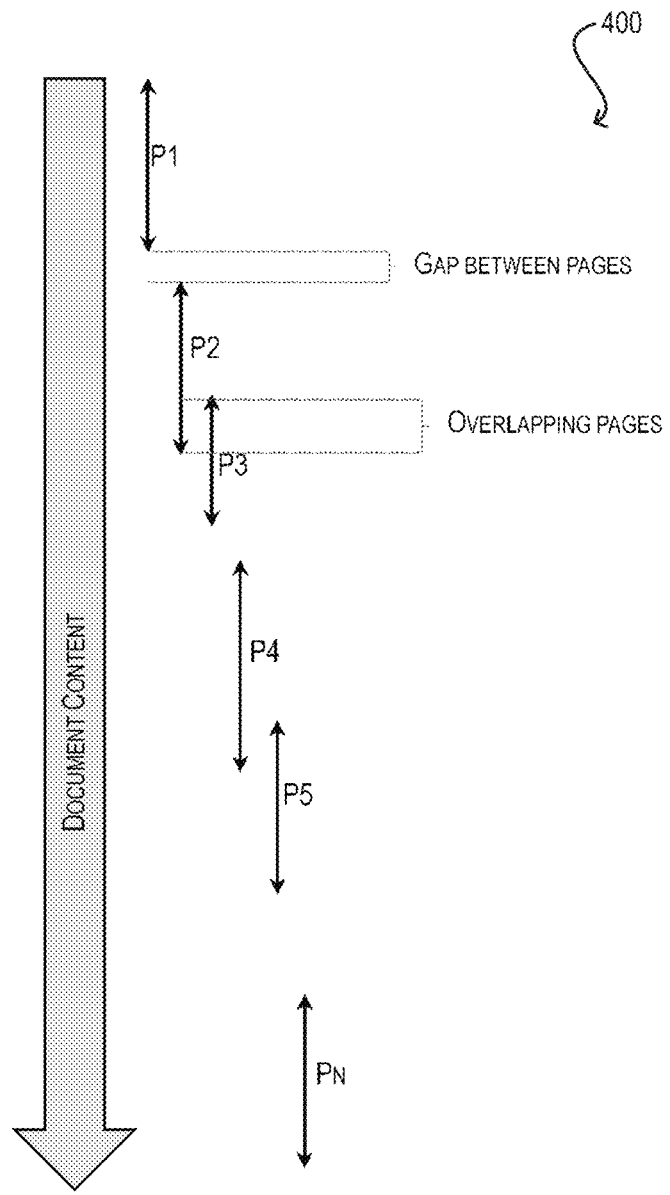
FIG. 4 depicts an example page set according to certain embodiments.

When a document is partitioned into a page set via multiple runs of the create page algorithm and the content of the document is subsequently modified (e.g., text is added, updated, or deleted), the DOM tree representations of at least some of the pages in the page set will no longer be correct, thus requiring a re-pagination process. For example, consider a scenario where page P1 in the page set is initially defined as encompassing characters C1-C100 of the document and page P2 in the page set is initially defined as encompassing characters C101-C200 of the document. Assume that a user modifies the document to introduce 50 new characters between C100 and C101. In this case, there will be "gap" in the page set between pages P1 and P2 corresponding to content that is not assigned to any page (i.e., the 50 new characters). Alternatively, in some scenarios overlapping portions may be created between pages. These potential gaps and overlaps are shown visually for an example document content flow 400 in FIG. 4.

Figure 5:
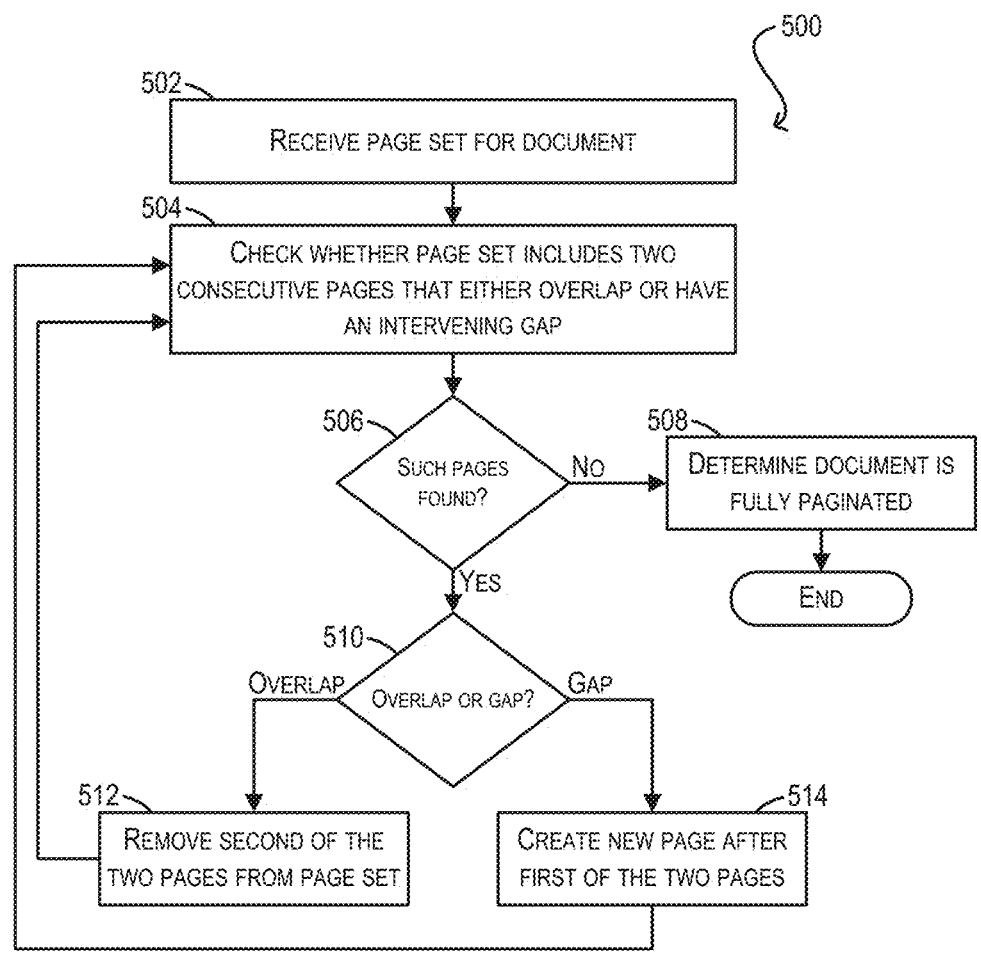
FIG. 5 depicts a workflow for re-paginating a browser document according to certain embodiments.

To address this, FIG. 5 depicts a flowchart 500 of an "update page set" algorithm that may be included in pagination logic 106 of FIG. 1 and executed by web application 104 for updating the pages of a document according to certain embodiments. Generally speaking, this algorithm takes as input a page set that may have various gaps or overlaps between its pages and outputs a page set that corresponds to a "fully paginated" state for the document (i.e., a state where (a) the page set fully covers the entirety of the document content, and (b) there are no gaps or overlaps between any two consecutive pages in the page set).

Starting with blocks 502 and 504, web application 104 can receive a page set S for a given document and check whether page set S includes two consecutive pages that either overlap (i.e., the same document content appears on both pages) or have an intervening gap (i.e., there is some document content between the end of the first page and the start of the second page that is not assigned to any page in page set S). Web application 104 can perform this check by examining the DOM tree of each page, as created via the create page algorithm, and comparing these DOM trees to the current version of the document content. If no such pages are found (block 506), web application 104 can conclude that the document is fully paginated (block 508) and can terminate the algorithm.

However, if two consecutive pages matching one of the criteria noted above are found (block 506), web application 104 can take one of two actions, depending on whether there is an overlap or a gap (block 510). If there is an overlap, web application 104 can execute a "remove page" operation for remove the second of the two consecutive pages from page set S (thereby creating a gap after the first page) (block 512).

Figure 6:
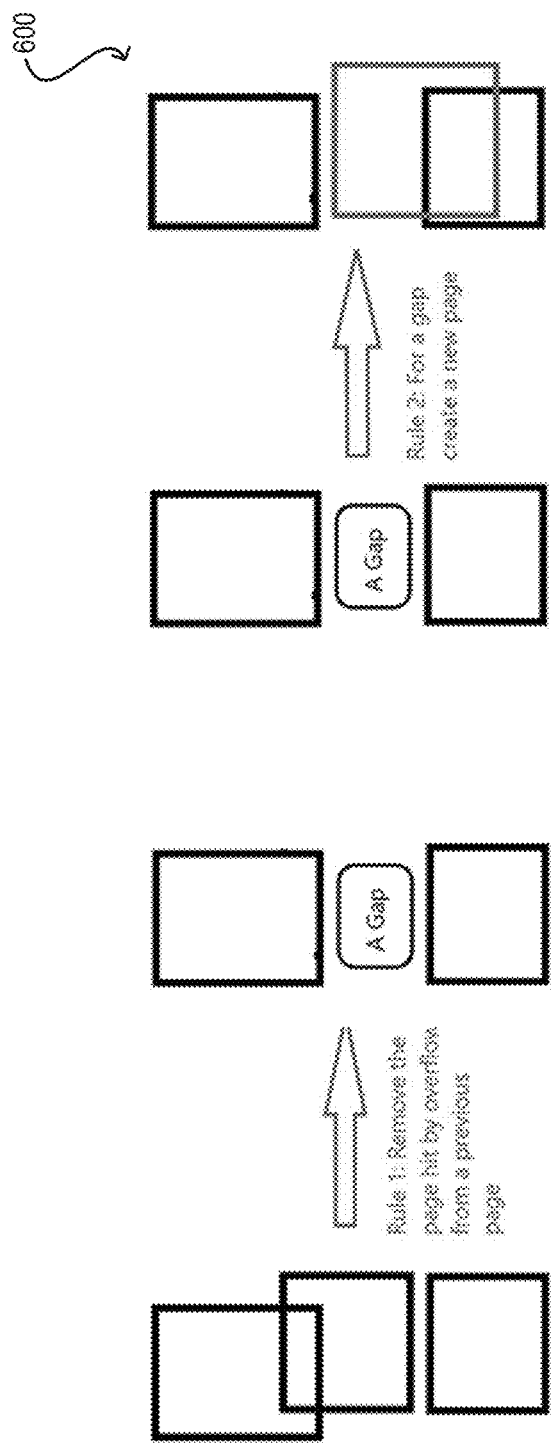
FIG. 6 depicts a high-level schematic diagram of the workflow of FIG. 5 according to certain embodiments.

Alternatively, if there is a gap, web application 104 can execute the create page algorithm of FIG. 2 by passing the next character/element after the end of the first page as the "start flow break" for that algorithm (block 514). In this way, web application 104 can define/create a new single page immediately following the first page that incorporates the document content that was in the gap. Note that this may result in an overlap between the newly created page and a subsequent page in page set S. FIG. 6 is a schematic diagram 600 illustrating the two alternative actions of blocks 512 and 514.

Upon the completion of either block 512 or 514, the flowchart can return to block 504 and web application 104 can re-check whether there are two consecutive pages in page set S with an overlap or intervening gap. The entire algorithm can repeat in this manner until the document has become fully paginated. Generally speaking, it can be proven that after a finite number of iterations, any document (regardless of the initial state of its page set) will converge to a fully paginated state. In other words, repeated execution of the steps shown in FIG. 5 will paginate/repaginate the document.

There are a number of benefits to the update page set algorithm of FIG. 5. First, because the remove page and create page operations performed at blocks 512 and 514 respectively are relatively simple operations that act only on local data (e.g., the pages that they pertain to) and not the entire document content, the complexity of implementing the code is low and its performance is high.

Second, in certain embodiments, the remove page and create page operations may be implemented as atomic operations that can be executed asynchronously. This means that the web browser in which the update page set algorithm is run can remain responsive to user input while pagination is in progress. This also allows for efficient handling of pagination/repagination in co-authoring scenarios where multiple users may interact with and modify the document at substantially the same time.

3. Pagination of a Browser Document with Multiple Linear Content Flows (Tables)

Figure 7:
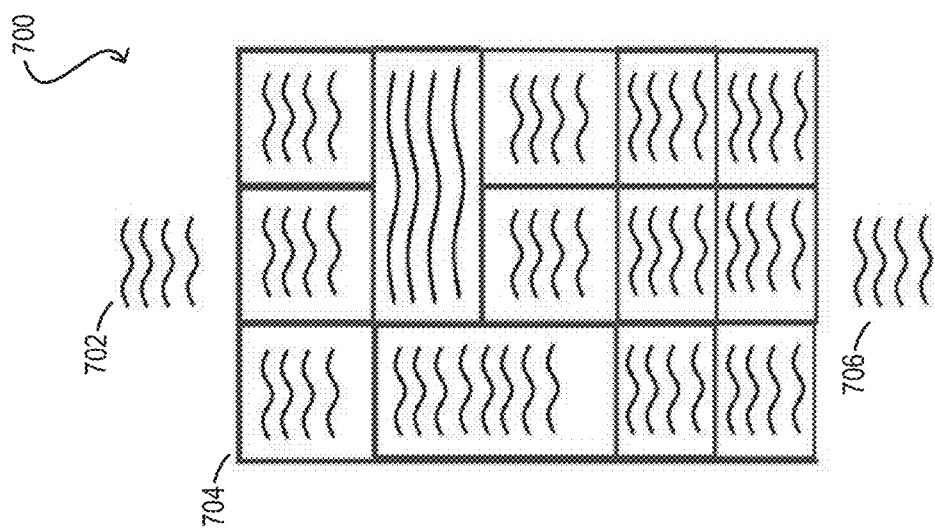

In addition to a linear content flow such as a sequence of paragraphs, in many instances a browser document may also include one or more tables comprising multiple columns of content. For example, FIG. 7 is a schematic diagram 700 of an example document including a first linear content flow 702, followed by a complex table 704 with multiple parallel columns of content, followed by a second linear content flow 706. One known way to paginate a document with a table like the one shown in FIG. 7 is to simply render the document without regard to pages and then forcefully "cut" the content along page boundary lines. However, this approach typically results in an undesirable outcome if a page boundary falls within the table, since the content of the table may be split in an unnatural way.

Figure 8:
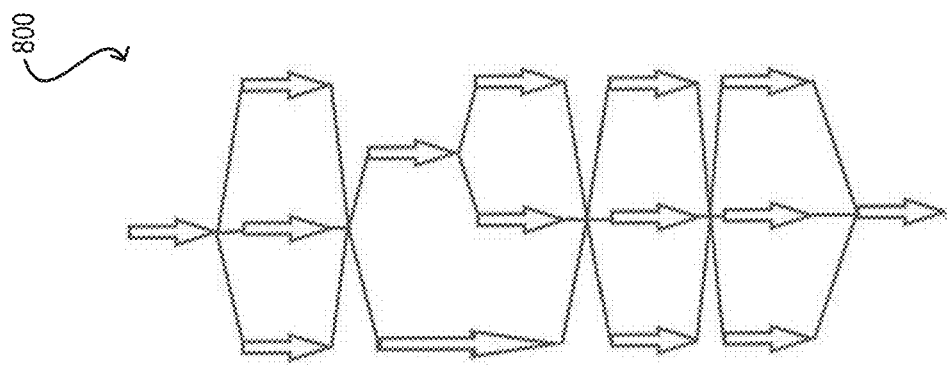
FIGS. 7 and 8 depict a browser document with multiple linear content flows (e.g., one or more tables) and a schematic representation of those flows according to certain embodiments.

Accordingly, certain embodiments of the present disclosure provide an enhanced version of the create page algorithm explained in section (2) above that effectively and efficiently paginates a browser document that may include one or more tables (in addition to one or more linear content flows). At a high level, this enhanced create page algorithm considers the structure of a document's content as a set of multiple linear content flows that can fork and join in various places. For instance, a table that contains 3 columns can be considered a forking of the document content into three parallel linear flows. When the table ends, these three parallel linear flows re-join into a single linear flow. Further, within the table itself, there may be various forks and joins depending on the structure of the table. To illustrate this, FIG. 8 depicts a flow structure 800 corresponding to the example document of FIG. 7. In FIG. 8, each arrow indicates an individual linear content flow within the document. As can be seen, these linear flows fork and join in accordance with the columns and rows shown in the table of FIG. 7.

In various embodiments, the structure of the enhanced create page algorithm for handling multiple linear flows is fundamentally similar to the implementation for handling a single linear flow—in particular, the algorithm operates over three phases or passes that include: (1) building the visuals of the new page, with some overflow; (2) invoking a browser API to have the browser's built-in layout engine measure/create the page layout and traversing in a bottom-up manner through the document to find the overflow position; and (3) removing all of the overflow elements from the DOM tree representation of the new page. However, in the enhanced version of the algorithm, the traversal portions of phases 1 and 2 are performed for every linear flow encountered in the document. For example, if the document content forks into three linear flows due to a 3-column table, the algorithm will traverse down each linear flow and add DOM nodes for that linear flow to the page's DOM tree. If these three linear flows do not re-join before the estimated end of the page is reached, this will result in a set of three estimated end flow breaks for the page—one for each parallel flow. The algorithm will then traverse in a bottom-up manner from each of those three estimated end flow breaks until an end flow break (i.e., the overflow position) is found in each linear flow, resulting in a set of three end flow breaks. Then, if the create page algorithm is called again to create another new page for the next portion of the document, this set of three end flow breaks can be passed into the algorithm as the start flow breaks for the next new page.

Figure 9:
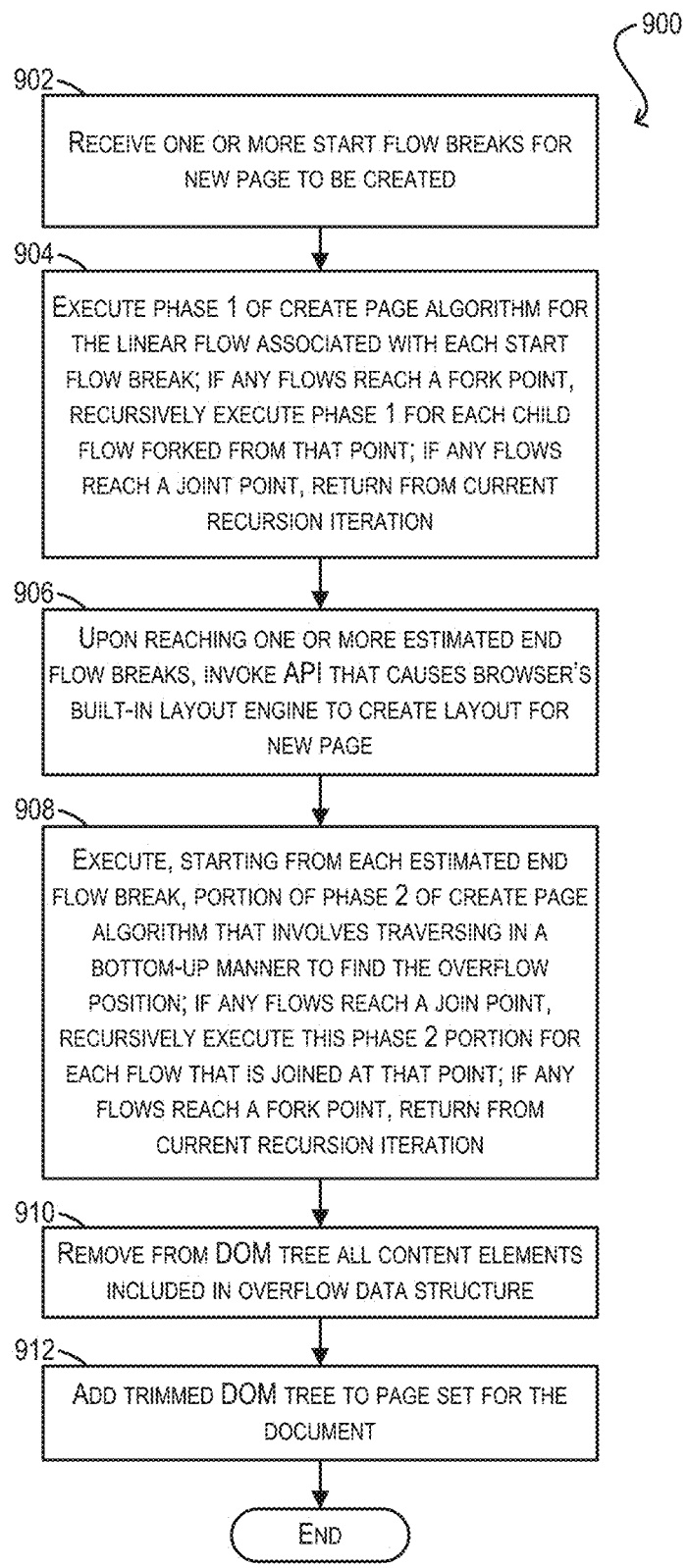
FIG. 9 depicts a workflow for defining a page with respect to a browser document comprising a multiple linear content flows according to certain embodiments.

FIG. 9 depicts a high-level flowchart 900 of this enhanced create page algorithm according to certain embodiments. Flowchart 900 refers to phases 1, 2, and 3 of the algorithm, which can be understood as roughly corresponding to the processing shown in FIGS. 2A, 2B, and 2C respectively.

At block 902, web application 104 can receive a set of one or more start flow breaks indicating the desired starting points for the new page to be defined/created. In the case that more than one start flow break is received, each start flow break can correspond to a starting point in a separate linear content flow of the document (e.g., a separate column in a table) where the last page in the document's page set ended.

At block 904, web application 104 can execute phase 1 of the create page algorithm with respect to each start flow break, which involves traversing down the linear content flow associated with the start flow break and adding DOM nodes for the content elements encountered within that linear flow to an in-memory DOM tree for the new page. As part of this process, if any of the linear content flows being traversed reaches a "fork" point, web application 104 can recursively invoke phase 1 for each of the child linear flows forked from that parent linear flow. In a particular embodiment, web application 104 can identify a fork point as being the start of a new table column in the document.

Additionally, if any of the linear content flows being traversed reaches a "join" point, web application 104 can return from the current recursion iteration of phase 1. In a particular embodiment, web application 104 can identify a join point as being the end of a table column in the document.

At block 906, upon reaching one or more estimated end flow breaks per the execution(s) of phase 1, web application 104 can invoke a browser API that causes the built-in layout engine of web browser 102 to measure and create the page layout for the new page. Web application (1) can then execute, starting from each estimated end flow break, the portion of phase 2 of the create page algorithm that involves traversing in a bottom-up manner through the document content to find the overflow position within each linear flow (block 908). As part of this process, if any of the linear content flows being traversed reaches a join point, web application 104 can recursively invoke that phase 2 portion for each of the linear flows joined into the current linear flow. Similarly, if any of the linear content flows being traversed reaches a fork point, web application 104 can return from the current recursion iteration of the phase 2 portion.

Finally, upon identifying one or more end flow breaks per the execution(s) of phase 2, web application 104 can remove, from its in-memory DOM tree representation of the new page, all of the overflow elements included in the overflow data structure (block 910) and add the DOM tree of the new page to the page set for the document (block 912), thereby concluding the algorithm.

4. Example Computing System/Device

Figure 10:
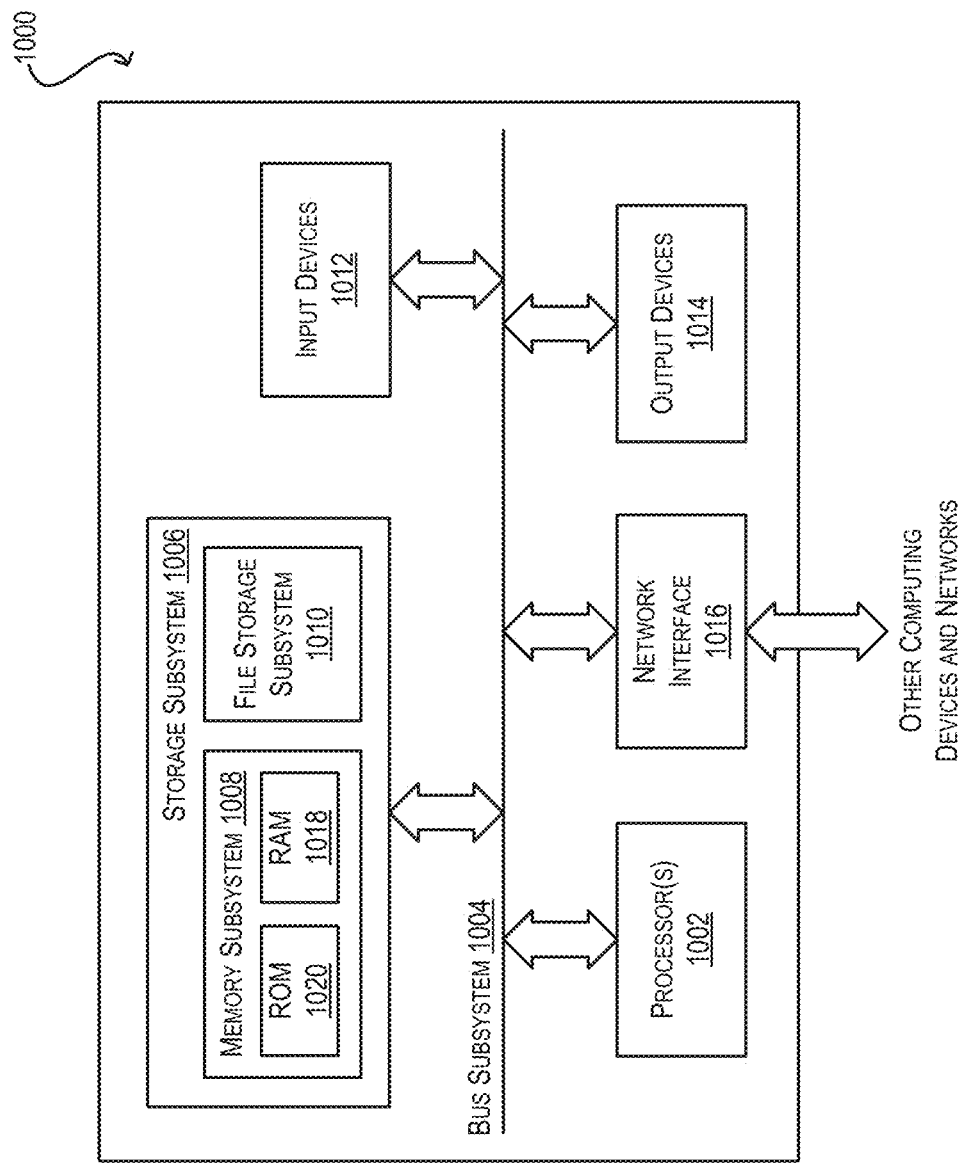
FIG. 10 depicts an example computing system/device according to certain embodiments.

FIG. 10 is a simplified block diagram illustrating the architecture of an example computing system/device 1000 according to certain embodiments. Computing system/device 1000 (and/or equivalent systems/devices) may be used to run any of the software described in the foregoing disclosure. For example, computing system/device 1000 may be used to implement system/device 100 of FIG. 1.

As shown in FIG. 10, computing system/device 1000 includes one or more processors 1002 that communicate with a number of peripheral devices via a bus subsystem 1004. These peripheral devices include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computing system/device 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks. Embodiments of network interface subsystem 1016 can include, e.g., an Ethernet module, a Wi-Fi and/or cellular connectivity module, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computing system/device 1000.

User interface output devices 1014 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computing system/device 1000.

Storage subsystem 1006 includes a memory subsystem 1008 and a file/disk storage subsystem 1010. Subsystems 1008 and 1010 represent non-transitory computer-readable storage media that can store program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computing system/device 1000 is illustrative and other configurations having more or fewer components than computing system/device 1000 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
 a processor; and
 a computer readable storage medium having stored thereon program code that, when executed by the processor, causes the processor to:
  receive an indication of a starting point for a page in a content flow of a document;
  build a DOM (Document Object Model) tree of content elements in a portion of the content flow spanning from the starting point to an estimated ending point, wherein the estimated ending point corresponds to an estimated ending boundary for the page, and wherein the estimated ending boundary for the page falls before an ending point of the document;
  invoke an API (application programming interface) that causes a layout engine of a web browser to create a layout of the page based on the DOM tree;
  determine, based on the layout and the content flow, one or more content elements in the content flow that fall beyond an actual ending boundary of the page;
  remove the one or more content elements from the DOM tree; and
  add the DOM tree to a page set for the document.

2. The computer system of claim 1 wherein the code that causes the processor to build the DOM tree comprises code that causes the processor to:
 traverse down the content flow, beginning from the starting point;

for each content element in the content flow that is encountered during the traversing, create a DOM node for the content element and add the DOM node to the DOM tree; and stop the traversing when the estimated ending point is reached.

3. The computer system of claim 1 wherein the API is a cross-browser API that is supported by a plurality of different web browsers.

4. The computer system of claim 1 wherein the estimated ending point falls beyond the actual ending boundary of the page.

5. The computer system of claim 1 wherein the estimated ending point is based on an estimated number of content elements that fit onto the page.

6. The computer system of claim 1 wherein the code that causes the processor to determine the one or more content elements in the content flow that fall beyond the actual ending boundary of the page comprises code that causes the processor to:

traverse up the content flow, beginning from the estimated ending point; and for each content element in the content flow that is encountered during the traversing, invoke an API that causes the browser to return a y-coordinate position of said each content element within the layout of the page.

7. The computer system of claim 6 wherein the code that causes the processor to determine the one or more content elements in the content flow that fall beyond the actual ending boundary of the page further comprises code that causes the processor to:

compare the y-coordinate position of said each content element with a predefined vertical size of the page; and if the y-coordinate position of said each content element exceeds the predefined vertical size, determine that said each content element falls beyond the actual ending boundary.

8. The computer system of claim 7 wherein the code that causes the processor to determine the one or more content elements in the content flow that fall beyond the actual ending boundary of the page further comprises code that causes the processor to:

add said each content element to an overflow data structure if the y-coordinate position of said each content element exceeds the predefined vertical size.

9. The computer system of claim 6 wherein the code that causes the processor to determine the one or more content elements in the content flow that fall beyond the actual ending boundary of the page further comprises code that causes the processor to:

stop the traversing upon reaching a content element that falls within the actual ending boundary of the page.

10. The computer system of claim 1 wherein the program code further causes the processor to:

define further pages within the content flow of the document and add the further pages to the page set, until the document reaches a fully paginated state.

11. The computer system of claim 10 wherein the program code further causes the processor to re-paginate the document in view of one or more content changes, the re-paginating comprising:

receiving the page set of the document; and checking whether any two consecutive pages in the page set overlap or have an intervening gap.

12. The computer system of claim 11 wherein the re-paginating further comprises:

if first and second consecutive pages in the page set have an overlap, removing the second page from the page set and re-executing the checking.

13. The computer system of claim 11 wherein the re-paginating further comprises:

if first and second consecutive pages in the page set have an intervening gap, defining a new page starting from an ending boundary of the first page.

14. The computer system of claim 1 wherein the document includes a plurality of content flows corresponding to one or more tables.

15. The computer system of claim 14 wherein building the DOM tree comprises:

recursively traversing down each of the plurality of content flows; and for each content element in the content flow that is encountered during the traversing, creating a DOM node for the content element and adding the DOM node to the DOM tree.

16. The computer system of claim 14 wherein the code that causes the processor to determine the one or more content elements in the content flow that fall beyond the actual ending boundary of the page comprises code that causes the processor to:

recursively traverse up each of the plurality of content flows; and for each content element in the content flow that is encountered during the traversing, invoke an API that causes the browser to return a y-coordinate position of the content element within the layout of the page.

17. The computer system of claim 14 wherein the program code further causes the processor to:

receive indications of a plurality of starting points for the page, the plurality of starting points corresponding to different locations within the plurality of content flows where a previous page in the page set of the document ended.

18. The computer system of claim 1 wherein the program code for executing the defining of the new page is implemented in JavaScript running within the web browser.

19. A method for implementing pagination, the method comprising:

receiving, by a computer system, an indication of a starting point for a page in a content flow of a document;

building, by the computer system, a DOM (Document Object Model) tree of content elements in a portion of the content flow spanning from the starting point to an estimated ending point, wherein the estimated ending point corresponds to an estimated ending boundary for the page, and wherein the estimated ending boundary for the page falls before an ending point of the document;

invoking, by the computer system, an API (application programming interface) that causes a layout engine of the web browser to create a layout of the page based on the DOM tree;

determining, by the computer system based on the layout and the content flow, one or more content elements in the content flow that fall beyond an actual ending boundary of the page;

removing, by the computer system, the one or more content elements from the DOM tree; and adding, by the computer system, the DOM tree to a page set for the document.

20. A non-transitory computer readable storage medium having stored thereon program code executable by a computer system, the program code causing the computer system to:
- receive an indication of a starting point for a page in a content flow of a document;
- build a DOM (Document Object Model) tree of content elements in a portion of the content flow spanning from the starting point to an estimated ending point, wherein the estimated ending point corresponds to an estimated ending boundary for the page and wherein the estimated ending boundary for the page falls before an ending point of the document;
- invoke an API (application programming interface) that causes a layout engine of a web browser to create a layout of the page based on the DOM tree;
- determine, based on the layout and the content flow, one or more content elements in the content flow that fall beyond an actual ending boundary of the page;
- remove the one or more content elements from the DOM tree; and
- adding the DOM tree to a page set for the document.

21. A computer system comprising:
- a processor; and
- a computer readable storage medium having stored thereon program code that, when executed by the processor, causes the processor to:
  - receive an indication of a starting point for a page in a content flow of a document;
  - build a DOM (Document Object Model) tree of content elements in a portion of the content flow spanning from the starting point to an estimated ending point, the estimated ending point corresponding to an estimated ending boundary for the page;
  - invoke an API (application programming interface) that causes a layout engine of a web browser to create a layout of the page based on the DOM tree;
  - determine, based on the layout and the content flow, one or more content elements in the content flow that fall beyond an actual ending boundary of the page by:
    - traversing up the content flow, beginning from the estimated ending point;
    - for each content element in the content flow that is encountered during the traversing, invoking an API that causes the browser to return a y-coordinate position of said each content element within the layout of the page;
    - comparing the y-coordinate position of said each content element with a predefined vertical size of the page; and
    - if the y-coordinate position of said each content element exceeds the predefined vertical size, determining that said each content element falls beyond the actual ending boundary and adding said each content element to an overflow data structure;
  - remove the one or more content elements from the DOM tree; and
  - add the DOM tree to a page set for the document.

* * * * *